United States Patent

Zirps

[11] 4,041,840
[45] Aug. 16, 1977

[54] CONTROL SYSTEM

[75] Inventor: Wilhelm Zirps, Hemmingen, Germany

[73] Assignee: Robert Bosch GmbH, Stuttgart, Germany

[21] Appl. No.: 641,914

[22] Filed: Dec. 18, 1975

[30] Foreign Application Priority Data

Dec. 31, 1974 Germany .................. 2461896

[51] Int. Cl.² ............... F15B 13/042; F15B 15/17
[52] U.S. Cl. ................. 91/416; 91/417 R; 91/422
[58] Field of Search .......... 91/416, 417, 422, 222, 91/418, 427, 460, 280; 92/75

[56] References Cited

U.S. PATENT DOCUMENTS

| 3,882,759 | 5/1975 | Formwalt et al. ........... 92/75 |
| 3,905,278 | 9/1975 | Ourdouillie ........... 92/85 A |

FOREIGN PATENT DOCUMENTS

| 1,256,797 | 12/1971 | United Kingdom ......... 91/460 |

*Primary Examiner*—Irwin C. Cohen
*Attorney, Agent, or Firm*—Michael J. Striker

[57] ABSTRACT

In a control system of the type having a hydraulic cylinder, a piston slidable in the cylinder and dividing the interior thereof into a first and a second pressure chamber, a pressure fluid reservoir, a pump, conduits having a valve interposed therein which is electronically controlled and connects the second chamber with the reservoir or pump, respectively, or block the second chamber, and an auxiliary device for operating the system in the event the electronic control for the valve malfunctions, the invention provides a movable member extending into the second chamber; subdividing means located in the second chamber intermediate the movable member and the piston and subdividing the second chamber into a first and a second compartment, the movable member being operable to shift the subdividing means in the second chamber; and valve means controlling communication between the compartments and of the same with the first chamber, the valve means forming with the piston and with the movable member a follow-up control.

15 Claims, 2 Drawing Figures

CONTROL SYSTEM

BACKGROUND OF THE INVENTION

This invention relates to a control system, and more particularly to a control system having a hydraulic working cylinder.

Control systems are known, for example for use in aircraft controls, where a servo-valve is utilized having a first stage which uses a nozzle-type baffle plate. When signal-generating devices which operate automatically and act upon the first stage to control operation of the same, become defective in this construction, a manually operable lever can be utilized to operate the first stage. However, these known systems are very expensive, especially because of the expensive servo-valve, and are therefore not suitable in applications where their expense is economically not justifiable.

SUMMARY OF THE INVENTION

It is an object of the invention to overcome the aforementioned disadvantages.

More particularly, it is an object of the invention to provide a control system of the general type in question, but which is simple and inexpensive in construction.

Another object is to provide such a control system which is of compact construction and is therefore widely useable, including in mobile applications.

Still a further object of the invention is to provide such a control system which is very reliable in operation.

One aspect of the invention accordingly resides in a control system of the type having a hydraulic cylinder, a piston slidable in the cylinder and dividing the interior thereof into a first and a second pressure chamber, a pressure fluid reservoir, a pump, conduits having a valve interposed therein which is electronically controlled and connects the second chamber with the reservoir or pump, respectively, or blocks the second chamber, and an auxiliary device for operating the system in the event the electronic control for the valve malfunctions, a combination, comprising a movable member extending into the second chamber; subdividing means located in the second chamber intermediate the movable member and the piston and subdividing the second chamber into a first and a second compartment, the movable member being operable to shift the subdividing means in the second chamber; and valve means controlling communication between the compartments and of the same with the first chamber, the valve means forming with the piston and with the movable member a follow-up control.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
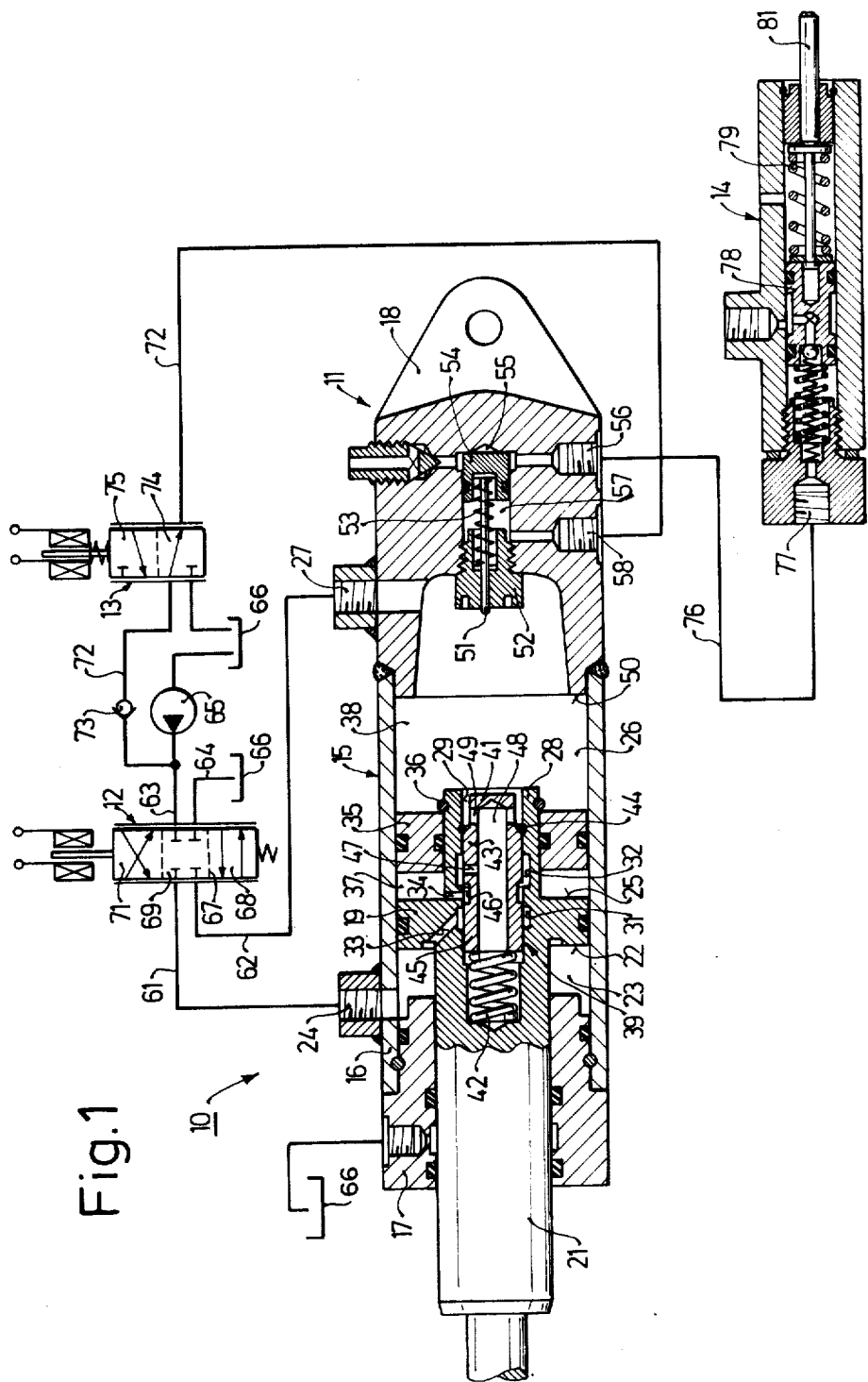
FIG. 1 shows a partially sectioned, diagrammatic view of one embodiment of the invention.

A first exemplary embodiment of the control system of the invention is shown in FIG. 1. The system in toto is designated with reference numeral 10 and includes a cylinder 11, two solenoid valves 12 and 13, and a controller or actuator 14.

As the drawing shows, the cylinder 11 has a housing 15 which is composed of a tubular member 16 and two end sections or units 17, 18 which close the member 16 at its opposite ends. A piston 19 is slidable in the housing 15 and has a piston rod 21 which extends outwardly through the end unit 17 where it is connected with a not-illustrated motion-pickup device.

Piston 19 is a differential piston, having a smaller effective surface 22 which faces an annular pressure chamber 23 which communicates with a port 24. The larger effective surface of piston 19 is identified with reference numeral 25 and faces a pressure chamber 26 which communicates with a port 27. A tubular projection 28 of piston 19 extends into the chamber 26 and has an outer diameter smaller than that of the piston rod 21. Projection 28 and piston 19 are formed with a bore 29 which is provided with an axially inner annular groove 31 and an axially outer groove 32. A connecting bore 33 communicates the groove 31 with the chamber 23, and a similar bore 34 communicates the bore 29 (intermediate the grooves 31, 32) with the chamber 26.

An auxiliary piston 35 is mounted on projection 28, on which it can slide in sealing engagement therewith. Piston 35 is concentric with piston 19 and its stroke is limited by the piston 19 and an abutment 36, respectively. The length of the stroke of piston 35 is adequate for an emergency adjustment, as will be explained later. Piston 35 subdivides chamber 26 into a compartment 37 located adjacent to piston 19, and a compartment 38 which is remote from the piston 19. A hollow slide member 41, forming a part of a valve 39, is mounted in the bore of projection 28 and is permanently biased by a spring 42 to the illustrated starting position in which it abuts with an axially outer annular land 43 against a circlip 44. When the member 41 is in this position, its axially inner annular lend 45 blocks the inner groove 31; at the same time, communication exists between the compartments 37 and 38 via an outer circumferential groove 46 in member 41, a bore 47, the hollow interior 48 of member 41, and apertures 49.

A displacing member 51 is mounted in the end unit 18, coaxially with member 41. The member 51 is sealingly but slidably guided in a screw nipple 52, so that it — together with an auxiliary piston 54 — can be permanently biased against the closed end of a blind bore 55 by the action of a biasing spring 53. At its side facing away from member 51, i.e. the side facing the closed end of bore 55, the piston 54 is exposed to fluid which can be admitted via a control port 56. The side of piston 54 which faces towards the nipple 52 defined with the same a chamber 57 that communicates with a port 58.

Coming now to the other elements of this sytem, it will be seen that fluid lines 61, 62 connect the ports 24, 27 with the solenoid valve 12. The latter is a four-way, three-position valve and communicates via line 63 with a pump 65 and via line 64 with a reservoir 66. Valve 12 has a slidable valving element 67 which, when the solenoid is not energized, is spring-biased to a rest position 68 in which it connects pump 65 with port 24 and port 27 with reservoir 66. When valving element 67 is shifted to a blocking position 69, all communication across it is interrupted whereas, when element 67 is shifted to a further position 71, the connections according to position 68 are reversed.

A fluid line 72 connects chamber 57 with pump 65; a one-way valve 73 and the solenoid valve 13 are interposed in line 72. Valve 13 is a three-way, two-position valve. In the illustrated position 74 of its valving element, valve 13 permits fluid flow through line 72, whereas in its spring-biased rest-position 75 (solenoid not energized) it communicates chamber 57 with reservoir 66. A fluid line 76 connects port 56 with an outlet port 77 of controller 14. The latter has a pressure piston 78 which is operatively connected via a spring 79 with a plunger 81. In turn, plunger 81 is insertable deeper into the housing of controller 14 in response to depressing of a gas-pedal of a vehicle turbine, the plunger 81 being suitably coupled with the gas pedal (not shown) or positioned to be engaged by the same.

Solenoid valves 12, 13 are operated by a not-illustrated electronic regulating device which produces signals in dependence upon operating parameters of a vehicle turbine and signals of the motion-pickup coupled with the piston rod 21.

When the electronic device causes valving element 67 of valve 12 to move to the blocking position 69, the piston 19 is hydraulically blocked against movement in either direction. However, when the valving element 67 is in the positions 71 or 68, the piston 19 moves outwardly or inwardly, respectively, because the chambers 23, 26 are alternately supplied with or relieved of pressure fluid. Slide member 41 blocks any communication between chambers 23, 26.

If the electronic regulating device functions properly, i.e. if there is no malfunction or defeat, the valving element of valve 13 is maintained in its working position 74 against the biasing force of a spring. The pressure of pump 65 is therefore communicated to chamber 57 where it acts upon piston 54. Due to the fact that the pump pressure is much higher than the counter-acting pressure produced by the controller 14, piston 54 remains in the illustrated rest position even though pressure on the gas pedal has moved the plunger 81 inwardly of the controller 14; all that happens is an increases stressing of spring 79.

Assuming, now, that the electronic regulating device malfunctions for any reason whatever, then the solenoid valve 12 (i.e. the valving element 67 thereof) will be shifted by the associated spring to the rest position 68, whereas the valving element of the valve 13 will be shifted by the associated spring to its rest position 75. The pump 65 will continue to pump pressure fluid via line 61 into the chamber 23, causing the piston 19 to be shifted to the right in FIG. 1, until the piston 35 is in engagement with the piston 19 and an abutment 50 of the section 18, respectively, the piston 35 being confined therebetween. During this movement fluid is expelled from compartment 37 via valve 39 and enters compartment 38. When the piston 19 reaches its righthand end position, the not yet displaced member 51 abuts the endface of member 41; the chamber 57 is in communication with reservoir 66 via fluid line 72 and valve 13.

If under these conditions the gas pedal is depressed, pushing the plunger 81 inwardly of the controller 14, the force of displacement of the plunger 81 is converted via spring 79 and piston 78 into a hydraulic pressure which acts via line 76 upon piston 54, shifting the same counter to the force of the weak spring 53. The member 51 now pushes member 41 into the bore 29, counter to the urging of spring 42, and the inner land 45 opens communication between chamber 23 and compartment 37 whereas the outer land 43 blocks communication with compartment 38. The pressure of pump 65 acts in compartment 37 upon the piston 19 and shifts it leftwards; this movement continues until the land 45 blocks the groove 31 and hence the compartment 37. This position is now maintained.

Conversely, when pressure upon the gas pedal is relaxed, the member 51 is shifted rightwards by spring 53, and the compartment 37 is initially again placed in communication with reservoir 66 via valve 39, compartment 38 and fluid line 62. Thus, the fluid pressure in chamber 23 can not shift the piston 19 rightwardly, and this movement continues until the communication between compartment 37 and reservoir 66 is interrupted again.

It is clear, therefore, that the position of piston 19 is regulated in dependence upon the respective position of the member 51, i.e. that the pistons 19, 35 the valve 39 and the member 51 operate as a follow-up control.

The stroke which piston rod 21 can perform for the emergency control, i.e., in the case when the electronic control device malfunctions, equals the stroke which piston 35 can perform on projection 28. It is only a fraction of the total stroke which the piston 19 (with its piston rod 21) normally performs, but is fully adequate for its intended purpose; e.g. for the emergency adjustment of gas-turbine guide vanes.

Figure 2:
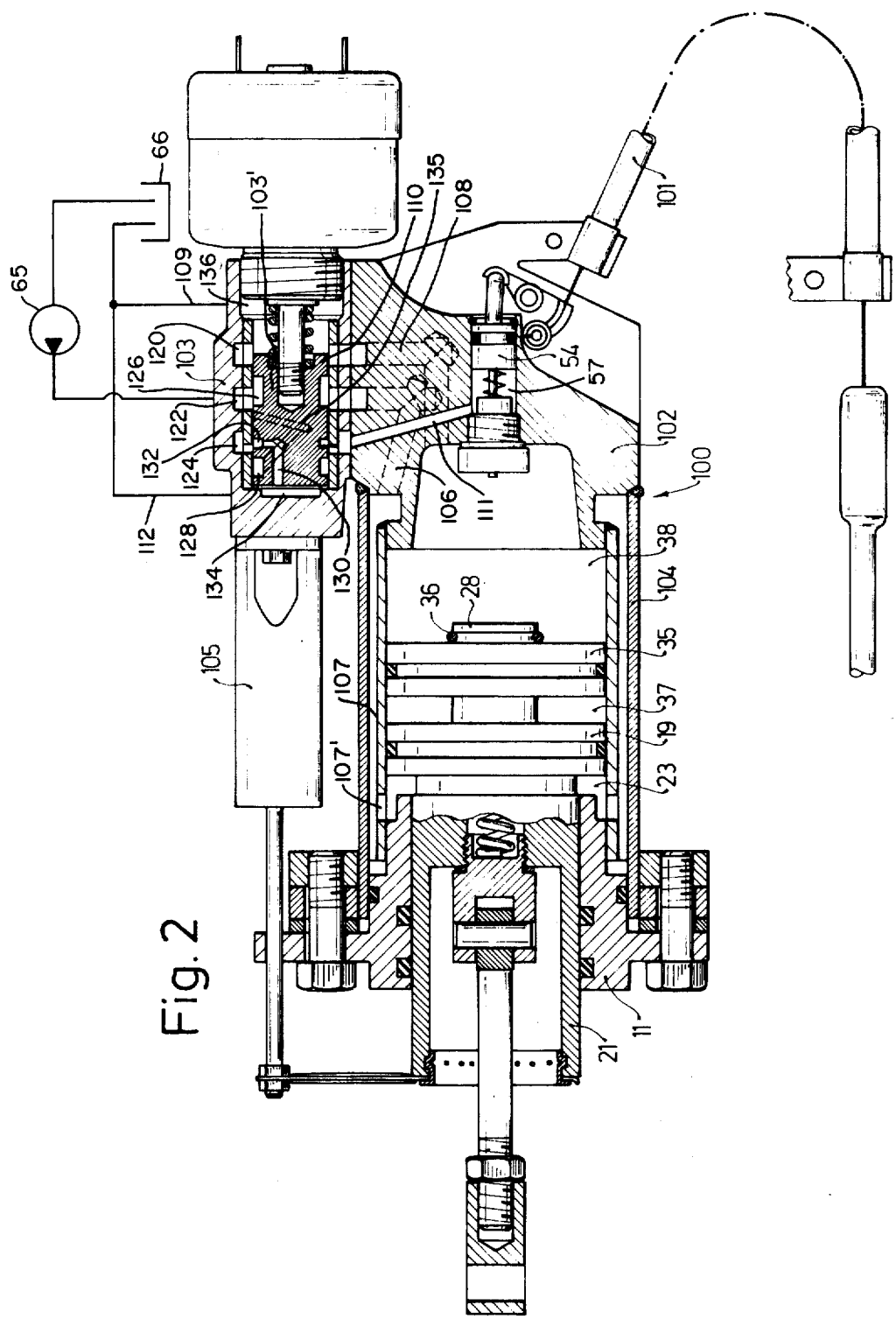
FIG. 2 is a fragmentary sectioned view illustrating a further embodiment.

The embodiment of FIG. 2 is largely the same as that in FIG. 1; therefore, like reference numerals have been used to designate like elements and those elements of FIG. 1 which have not been shown in FIG. 2 and which are not replaced by other elements in FIG. 2 should be understood to be the same as in FIG. 1.

The system 100 of FIG. 2 has an auxiliary piston 54 which has its movement controlled mechanically, by means of a Bowden linkage 101.

Mounted on the end unit 102, e.g. flanged onto the same, is a solenoid valve 103 which controls movement of the piston 19 by way of a three-way three-position valving element, and which controls movement of the piston 54 by way of a three-way two-position valving element. The tube 16 is concentrically surrounded by a tube 104 through which pressure fluid is supplied to chamber 23. An inductively operating position transducer 105 is mounted on the housing of cylinder 11.

It will be understood that the operation of the FIG. 2 embodiment is essentially the same as in FIG. 1. The essential difference resides in the fact that due to the three-way three-position operation of valve 103 the chamber 23 constantly receives pressure fluid from pump 65, and that the piston 54 is operated mechanically. Since the embodiment of FIG. 2 combines the separate valves 12, 13 of FIG. 1 into the single valve 103 which is mounted directly on the cylinder 11, this embodiment is especially compact and therefore particularly well suited for mobile applications.

The system of the invention is simple and inexpensive. Its components do not require to be manufactured to the precise tolerances which are needed in servo-valves, and the system is excellently suited for heavy-duty service because it is not readily susceptible to malfunctions. Needless to say, the illustrated embodiments are exemplary only and modifications are readily possible. For example, the member 51 can be moved mechanically, hydraulically or electrically. Also, the piston 35 can be omitted if projection 28 can itself directly enter into an appropriate recess formed in end unit 18, although this latter modification does not allow operating forces to be produced of the same magnitude as when the piston 35 is present.

It will be understood that each of the elements described above, or two or more together, may also find a useful application in other types of constructions differing from the types described above.

While the invention has been illustrated and described as embodied in a control system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. In a follow-up control system, a combination comprising:

A. means for changing the position of a movable element during operation of the control system, including a hydraulic cylinder having an interior for accommodating fluid;

a piston mounted for movement relative to said cylinder, said piston having a leading portion which divides the interior of said cylinder into a first and a second chamber, and a trailing portion adapted to be coupled to the element to be moved;

means for pumping fluid;

means for receiving fluid;

conduit means defining a fluid flow path intermediate said pumping means and one of said chambers, and another fluid flow path intermediate said receiving means and the other of said chambers; and means for moving said piston relative to said cylinder, including switching means having a multi-position valving member movable in said flow paths for directing fluid flow, and electronic control means for moving said valving member between one position in which said chambers are respectively connected to said pumping means and said receiving means for moving said piston in one direction, and another position in which said chambers are respectively oppositely connected to said pumping means and said receiving means for moving said piston in an opposite direction; and B. safety override means for adjusting the position of the movable element in the event of malfunction of said electronic control means, including means associated with said piston for subdividing said second chamber into a first and a second compartment said first compartment being defined in part by said piston;

valve means having a valve element mounted on said piston for movement relative thereto between a first position in which said compartments are in communication with each other, and a second position in which said first chamber communicates with said first compartment;

a pressure-responsive movable member having a contact side facing said valve element, and an opposite side;

means for biasing said valving member of said switching means in the event of malfunction of said electronic control means to said one position in which said piston is moved in said one direction until said valve element mounted thereon overlies said contact side; and actuating means at said opposite side of said pressure-responsive member for moving said contact side of the latter into force-transmitting engagement with said valve element so as to move the latter from said first position towards said second position in which fluid from said first chamber enters said first compartment so as to move said piston in direction opposite to said one direction, whereby the position of the movable element is adjusted despite failure of said electronic control means.

2. A combination as defined in claim 1, wherein said subdividing means is an auxiliary piston.

3. A combination as defined in claim 2, wherein said piston is a differential piston having a smaller effective surface and a larger effective surface which faces into said second chamber, a projection extending from said larger effective surface into said second chamber, said auxiliary piston being slidably mounted on said projection, and an axial bore formed in said projection having an open end facing towards said pressure responsive movable member, said valve means comprising a slidable valve element slidably received in said bore.

4. A combination as defined in claim 3, wherein said piston, said auxiliary piston, said projection, said valve element and said pressure responsive movable member are all coaxial with one another.

5. A combination as defined in claim 3, wherein said auxiliary piston has freedom of performing relative to the first-mentioned piston a stroke having a length which equals a fraction of the stroke performed by said first-mentioned piston, said pressure responsive movable member being movable through a distance corresponding to said stroke of said auxiliary piston.

6. A combination as defined in claim 3, said valve means further comprising s spring biasing said valve element to said first position in which it blocks said first chamber and communicates said compartments with one another, said valve element being movable to said second position in which it interrupts communication between said compartments and communicates said first compartment with said first chamber.

7. A combination as defined in claim 6, wherein said valve element is also movable to an intermediate position in which it interrupts communication of said first compartment with both said second compartment and said first chamber.

8. A combination as defined in claim 6, wherein said valve element is hollow and in said first position engages an abutment that is fixedly mounted on said projection.

9. A combination as defined in claim 1, said cylinder having an abutment in said second chamber, and said valve element is movable to and from an initial position which is so selected that when said subdividing means engages both said abutment and said piston, said movable member contacts said valve element when said movable member is itself in rest position.

10. A combination as defined in claim 1, wherein said switching means is a solenoid valve of the four-way three-position type having a valving member which is spring-biased to said one position thereof in which it communicates said first chamber with said pumping means and said second chamber with said receiving means.

11. A combination as defined in claim 10; further comprising a spring biasing said movable member to a rest position in which it engages an auxiliary piston which in part bounds a fluid chamber that communicates with said pumping means via a fluid line wherein another solenoid valve is interposed.

12. A combination as defined in claim 11, said auxiliary piston having one side facing said fluid chamber and another side facing away from said fluid chamber and communicating via a fluid line with said actuating means comprising a hydraulic control device having a casing, a pressure piston movable in said casing, a plunger insertable into said casing, and a spring connecting said plunger with said pressure piston.

13. A combination as defined in claim 1, wherein said actuating means comprises a Bowden use chained linkage.

14. A combination as defined in claim 1; said switching means being a solenoid valve mounted on said cylinder.

15. A combination as defined in claim 14, wherein said solenoid valve has a three-position three-way function and a three-way two-position function.

* * * * *